(12) United States Patent
Fuller

(10) Patent No.: US 7,625,309 B2
(45) Date of Patent: Dec. 1, 2009

(54) CONTINUOUSLY VARIABLE TRANSMISSION

(75) Inventor: John William Edward Fuller, Preston (GB)

(73) Assignee: Torotrak (Development) Limited, Lancashire (GB)

(*) Notice: Subject to any disclaimer, the term of this patent is extended or adjusted under 35 U.S.C. 154(b) by 445 days.

(21) Appl. No.: 10/541,955

(22) PCT Filed: Jan. 8, 2004

(86) PCT No.: PCT/GB2004/000042

§ 371 (c)(1),
(2), (4) Date: Apr. 17, 2006

(87) PCT Pub. No.: WO2004/063602

PCT Pub. Date: Jul. 29, 2004

(65) Prior Publication Data

US 2006/0201766 A1 Sep. 14, 2006

(30) Foreign Application Priority Data

Jan. 9, 2003 (GB) ................................. 0300419.9

(51) Int. Cl.
*F16H 61/30* (2006.01)
(52) U.S. Cl. .................. 476/10; 476/2; 476/42
(58) Field of Classification Search .................. 476/40, 476/42, 47, 48, 2, 9, 10
See application file for complete search history.

(56) References Cited

U.S. PATENT DOCUMENTS 4,464,952 A * 8/1984 Stubbs ...................... 475/216

4,750,381 A 6/1988 Kita et al.

(Continued)

FOREIGN PATENT DOCUMENTS

EP 0 43184 1/1982

(Continued)

OTHER PUBLICATIONS

PCT Written Opinion of the International Searching Authority for PCT/GB2004/000042, mailed May 18, 2004, 5 pages.

(Continued)

*Primary Examiner*—David M Fenstermacher
(74) *Attorney, Agent, or Firm*—Blakely, Sokoloff, Taylor & Zafman LLP

(57) ABSTRACT

A continuously variable transmission is disclosed comprising a transmission input and output between which a variator (V) can be coupled, in either a low regime or a high regime, by gearing (R1, R2, R3, M). The relationship between variator ratio and overall transmission ratio is different in the two regimes. Incorporated in the gearing are first and second clutch means (L, H) both hydraulically actuated, for engaging and disengaging low and high regimes respectively. The gearing provides a synchronous ratio at which a change between low and high regimes, at constant variator ratio, provides no change in the overall transmission ratio. The transmission is provided with hydraulics which incorporate a shift valve (110) which controls application of hydraulic pressures to the first and second clutch means. A change in state of the shift valve (110) causes one clutch means to change from engaged to disengaged and the other to make the opposite transition. In this way changes of transmission regime are hydraulically controlled.

9 Claims, 8 Drawing Sheets

U.S. PATENT DOCUMENTS

| | | | |
|---|---|---|---|
| 5,139,466 A | | 8/1992 | Perry |
| 5,564,998 A | | 10/1996 | Fellows |
| 5,669,846 A | | 9/1997 | Moroto et al. |
| 5,766,105 A | | 6/1998 | Fellows et al. |
| 6,457,382 B2 | * | 10/2002 | Cronin et al. ............... 74/733.1 |
| 6,634,977 B2 | * | 10/2003 | Ooyama ...................... 475/208 |
| 6,909,953 B2 | * | 6/2005 | Joe et al. ....................... 701/51 |
| 7,354,368 B2 | * | 4/2008 | Pollman ........................ 475/72 |
| 7,371,204 B2 | * | 5/2008 | Reuschel et al. ............... 477/45 |
| 2001/0029218 A1 | | 10/2001 | Cronin et al. |
| 2002/0086764 A1 | | 7/2002 | Ooyama |
| 2002/0094904 A1 | * | 7/2002 | Kuramoto et al. ........... 475/207 |

FOREIGN PATENT DOCUMENTS

| | | |
|---|---|---|
| EP | 0 177 240 A2 | 4/1986 |
| EP | 0 185 463 B1 | 11/1988 |
| EP | 0 423 932 A1 | 4/1991 |
| EP | 0 679235 | 11/1995 |
| EP | 1 174 645 A2 | 1/2002 |
| WO | WO 02/099317 A1 | 12/2002 |

OTHER PUBLICATIONS

PCT International Search Report for, PCT/GB2004/000042, mailed May 18, 2004, 9 pages.

European Search Report for GBA 0300419, mailed Jul. 2, 2003, 3 pages.

UK Search Report for GB 0300419.9, Jul. 8, 2003, 2 pages.

* cited by examiner

CONTINUOUSLY VARIABLE TRANSMISSION

CROSS-REFERENCE TO OTHER APPLICATIONS

This is a National Phase of International Application No. PCT/GB2004/000042, filed on Jan. 8, 2004, which claims priority from Great Britain Patent Application No. 0300419.9, filed on Jan. 9, 2003.

The present invention is concerned with continuously variable ratio transmissions of the type operable in two or more different "regimes" and more particularly with control of transitions from one regime to another.

Continuously variable transmissions e.g. for motor vehicles require some unit capable of providing a stepless range of transmission ratios. Such a unit will be referred to herein as a "variator". The present invention is particularly appropriate to use with variators of the so-called toroidal race rolling traction type, particularly where such a variator is torque controlled. However the invention has applications in connection with variators of other types.

An example of a rolling traction type variator is illustrated, in highly schematic format, in FIG. 1. This drawing shows a variator 10 of the "full toroidal" type. Here, two input discs 12, 14 are mounted upon a drive shaft 16 for rotation therewith and have respective part toroidal surfaces 18, 20 facing toward corresponding part toroidal surfaces 22, 24 formed upon a central output disc 26, two toroidal cavities being thus defined by the discs. The output disc is journalled such as to be rotatable independently of the shaft 16. Drive from an engine or other prime mover, input via the shaft 16 and input discs 12, 14, is transferred to the output disc 26 via a set of rollers disposed in the toroidal cavities. A single representative roller 28 is illustrated but typically three such rollers are provided in each cavity. An end load applied across the input discs 12, 14 by a hydraulic end load arrangement 15 provides pressure forces between rollers and discs to enable such transfer of drive. Drive is taken from the output disc to further parts of the transmission, typically an epicyclic mixer, as is well known in the art and described, e.g., in European patent application 85308344.2, which was published as EP 0185463. Each roller is journalled in a respective carriage 30 which is itself coupled to a hydraulic actuator 32 whereby an adjustable translational force can be applied to the roller/carriage combination. As well as being capable of translational motion the roller/carriage combination is able to rotate about the axis of a piston 31 of the actuator 32 to change the "tilt angle" of the roller and to move the contacts between rollers and discs, thereby allowing variation in the variator transmission ratio, as is well known to those skilled in the art.

The illustrated variator is of the type known in the art as "torque controlled". The hydraulic actuator 32 exerts a controlled force on the roller/carriage and for equilibrium this must be balanced by the reaction force upon the roller resulting from the torques transmitted between the disc surfaces 18, 20, 22, 24 and the roller 28. As is well known in the art, the centre of the roller is constrained to follow the centre circle of the torus defined by the relevant pair of discs. The axis of the piston 31, determined by the positioning of the actuator 32, is angled to the plane of this centre circle. This angle is referred to as the "castor angle". The well known result of this arrangement is that in use each roller automatically moves and precesses (rotates about the piston axis) to the location and tilt angle required to transmit a reaction torque determined by the biasing force from the actuator 32. Reaction torque is the sum of the torques input to and output from the variator. The biasing force is adjusted by means of a hydraulic circuit through which fluid is supplied to opposite sides of the piston 34 of the hydraulic actuator 32 at respective, adjustable pressures through hydraulic lines 36 and 38.

Variators typically do not on their own provide a range of ratios wide enough for motor vehicle and other applications. Hence a complete transmission typically includes not only the variator itself but also gearing for implementing at least two different regimes referred to herein as "high" and "low" regimes. Multi-regime continuously variable transmissions are very well known in the art. A brief description of the principles only will be provided herein. For more detail reference is directed e.g. to U.S. Pat. No. 4,464,952 or its European equivalent EP 43184. The present invention is also applicable to transmissions which provide three or more regimes, the applicant's own U.S. Pat. No. 5,564,998 and its European equivalent EP 679235 giving an example of such an arrangement. The content of these documents is incorporated herein by reference.

In low regime the range of ratios available from the variator maps onto a low range of ratios from the transmission as a whole. In fact it is well known, by use of a summing epicyclic shunt, to arrange that low regime includes both forward and reverse gears as well as "geared neutral" at which the transmission's speed reduction is infinite, and its output is consequently stationary despite rotation of its input. In high regime the variator ratio maps onto a higher range of transmission ratios. In order to provide a smooth transition from one regime to another, the gearing is selected such that, at a certain variator ratio, the ratio provided by the transmission as a whole is the same whether high or low regime is selected. This is referred to as the "synchronous ratio" and by ensuring that regime change takes place only when the variator is operating at this ratio, any shock upon regime change is minimized.

To sweep the transmission as a whole from one extreme of its ratio range (highest reverse gear) to the other (highest forward gear) involves firstly sweeping the variator from one extreme of its range to the other, then changing regime, and then sweeping the variator back through its range. Thus in one regime (low regime, typically) a decrease in variator ratio produces an increase in ratio from the transmission as a whole. In the other regime (high regime, typically) an increase in variator ratio is required to increase transmission ratio. Hence at the regime change the direction of action of each actuator 32 must be reversed.

In a transmission using a torque controlled variator of the above described type, in order to maintain continuity of torque, it is necessary to alter the magnitude of the variator control pressures upon regime change. A given variator reaction torque (corresponding to a given pressure difference across the variator pistons 34) produces a larger torque at the transmission output in low regime (which effectively provides a low gearing ratio between the variator output and the transmission output) than in high regime (in which the effective ratio between the variator output and the transmission output is higher). The magnitude of the pressure difference applied to the variator pistons needs to be adjusted to take account of this effect and avoid a potentially perceptible change in output torque on regime change.

In the type of transmission using a summing epicyclic mixer, high and low regimes are typically selected by means of clutches. A known manner of managing regime change involves the following steps (and a change from low to high regime will be considered although a change from high to low is essentially the reverse process):

i. low regime is first selected by engagement of a low regime clutch. As ratio rises, the control electronics detect when the variator approaches synchronous ratio and at the appropriate time engage a high regime clutch. In this condition, with high and low regime clutches engaged, the input and output of the epicyclic mixer are locked together and the ratio of the entire transmission is consequently fixed at the synchronous ratio. In effect, this provides a third operating regime, to be referred to herein as "fixed synchronous ratio";

ii. while the transmission is in fixed synchronous ratio, first and second control valves controlling pressures in the lines 36, 38 are adjusted to provide a pressure difference at the pistons 34 appropriate to the next regime (high). As explained above, the sense of the pressure difference is reversed and its magnitude is adjusted. These adjustments do not have an immediate effect on the transmission torque since the ratio is fixed; and iii. the low regime clutch is disengaged to effect the change to high regime.

The process is software controlled and takes an appreciable time—as much as half a second in some instances. Indeed the applicant's U.S. Pat. No. 4,464,952, referred to above, teaches that the clutch disengagement required to enter the new regime can be delayed until the engine speed differs from that required for optimal operation by a chosen margin, thereby deliberately introducing a pause in the regime change process while the transmission is held in fixed synchronous ratio.

The two clutches and the variator control pressures are all controlled by electrically operated valves and the changes upon regime change are electrically managed.

The above three steps provide an effective method of managing regime change and can provide a smooth transition. It is desired nonetheless to make improvements in this regard. The inventors have identified some relevant issues:

a. engine acceleration on entering fixed synchronous ratio. It is often necessary to have the engine accelerate rapidly while the transmission ratio correspondingly falls. The same thing is done by a conventional automatic gearbox and engine upon "kickdown" when the driver demands a rapid increase in power. In the two regime continuously variable transmission, this can lead to a poor regime change. While the engine is accelerating and the transmission ratio falling, the engine's torque goes partly to the driven wheels and partly to overcoming inertia (of the engine, and of some parts of the transmission). Upon entering fixed synchronous ratio—i.e. when the transmission ratio is locked—the rate of engine acceleration must fall and so less of the engine torque goes to overcoming inertia, with a resultant rise in torque at the wheels. Leaving synchronous ratio produces a subsequent fall in torque at the wheels. These torque changes may be perceptible to the driver.

b. time in fixed synchronous ratio. During normal operation (away from fixed synchronous ratio) the control software typically provides approximately constant engine speed for a constant power demand. While in fixed synchronous ratio the engine speed must rise and fall in proportion to vehicle speed. If the regime change takes place during vehicle acceleration then engine speed must increase while in fixed synchronous ratio (since in that state the ratio is fixed and wheel speed is thus proportional to engine speed) and it is necessary after leaving fixed synchronous ratio to bring the engine back to the optimal speed, requiring a modification in engine or transmission settings potentially perceptible to the driver.

c. pressure error leaving synchronous ratio. If the variator control input (e.g. the above described pressure differential) has not been accurately set for the new regime upon leaving fixed synchronous ratio then there will be a torque discontinuity. This is because wheel torque, having been largely dependent on engine torque while in fixed synchronous ratio, once more becomes largely dependent upon the variator control input when leaving this condition.

Some torque discontinuities can in fact be accommodated by what is referred to as "drive line wind up". The vehicle drive line has some compliance and can absorb minor shocks, but only if they are sufficiently brief.

An object of the present invention is to provide for an improved regime change in a continuously variable ratio transmission.

In accordance with a first aspect of the present invention there is a continuously variable transmission comprising a transmission input, a transmission output, a continuously variable transmission unit ("variator") which provides a continuously variable variator ratio, and gearing constructed and arranged to couple the variator between the transmission input and the transmission output in either of a low regime and a high regime, so that the transmission output is drivable from the transmission input at a transmission ratio which is related to the variator ratio, the relationship between the variator ratio and the transmission ratio being different in the two regimes, the gearing incorporating first hydraulically actuated clutch means for engaging and disengaging low regime and second hydraulically actuated clutch means for engaging and disengaging high regime and being such as to provide a synchronous ratio at which a change between low and high regimes at constant variator ratio produces no change in transmission ratio, and the transmission being provided with hydraulics incorporating a shift valve which controls application of hydraulic pressures to the first and second clutch means, so that a change in state of the shift valve causes one of the clutch means to change from engaged to disengaged and the other of the clutch means to change from disengaged to engaged, thereby causing the transmission to change from one regime to the other.

Thus in the transmission according to the present invention the relative timing of the engagement of one clutch means and disengagement of the other is controlled not by software but by the hydraulics and a rapid regime change can be effected. Indeed engagement of one clutch means and disengagement of the other may take place concurrently.

Preferably the shift valve is a two state valve which causes the transmission to adopt low regime when in one state and high regime when in the other state.

The clutch means may in some embodiments take the form of a brake rather than a clutch as such. By braking a chosen part of an epicyclic mixer, for example, one regime or the other may be engaged.

The shift valve need not control the first and second clutch means directly. In a preferred embodiment, the shift valve is an electrically controlled valve which applies a hydraulic control pressure to a clutch control valve which in turn controls application of hydraulic pressures to the first and second clutch means. Preferably the clutch control valve has two states in one of which it connects the first clutch means to high pressure and exhausts the second clutch means and in the other of which it connects the second clutch means to high pressure and exhausts the first clutch means.

In a particularly preferred embodiment of the present invention the variator is of the torque controlled type, comprising at least one hydraulic actuator whose force determines variator reaction torque, the shift valve controlling application of hydraulic pressure to the actuator so that a change in state of the shift valve reverses the direction of action of the actuator and so reverses the variator reaction torque. By using a single valve to initiate both (i) the changes in the state of the clutch means and (ii) the reversal of variator reaction torque which are required upon regime change, the timing of those events can be closely synchronised.

Preferable a change in state of the shift valve also causes a change in the magnitude of the actuator force. In this way the change in magnitude of the reaction torque, required to maintain wheel torque during regime change, can also be managed by the hydraulics rather than the software. A particularly preferred arrangement of this type comprises means for providing first and second adjustable variator control pressures, and a switching valve having a first state, in which it applies the first variator control pressure to a first side of the hydraulic actuator, and a second state, in which it applies the second variator control pressure to a second side of the hydraulic actuator, so that a change in state of the switching valve produces a change in magnitude and direction of the actuator's force. The switching valve is preferably separately formed from the shift valve and a hydraulic output from the shift valve controls the state of the switching valve.

Preferably the control pressure is supplied to a reducing valve whose output pressure forms the second variator control pressure. The reducing valve may serve to maintain a substantially constant ratio between the first and second control pressures.

To provide over-run conditions, when the engine is used to provide braking at the vehicle wheels, it is desirable to reverse the direction of the variator reaction torque without changing regime. This is, in a preferred embodiment, provided for by provision of a crossover valve which is connected between the switching valve and the hydraulic actuator so that a change in state of the crossover valve reverses the direction of action of the hydraulic actuator without regime change. Preferably the crossover valve is electrically controlled independently of the shift valve.

According to a second aspect of the present invention there is a continuously variable transmission comprising a transmission input, a transmission output, a continuously variable unit ("variator") which provides a continuously variable variator ratio and gearing constructed and arranged to couple the variator between the transmission input and the transmission output in either of a low regime and a high regime, whereby the transmission output is drivable from the transmission input at a transmission ratio which is related to the variator ratio, the relationship between transmission ratio and variator ratio being different in the two regimes, the gearing incorporating means for engaging and disengaging both low and high regimes and being such as to provide a synchronous ratio at which a change between low and high regimes at constant variator ratio produces no change in transmission ratio and the transmission further comprising control means adapted to effect a regime change by concurrently initiating engagement of the next regime and disengagement of the current regime.

Specific embodiments of the present invention will now be described, by way of example only, with reference to the accompanying drawings in which.

The specific embodiments to be described are for use with a variator of full toroidal rolling-traction type with hydraulic control although the invention is believed to be adaptable to use with variators of other types. The embodiments are motor vehicle transmissions although the invention is applicable to transmissions for other purposes.

Figure 2:
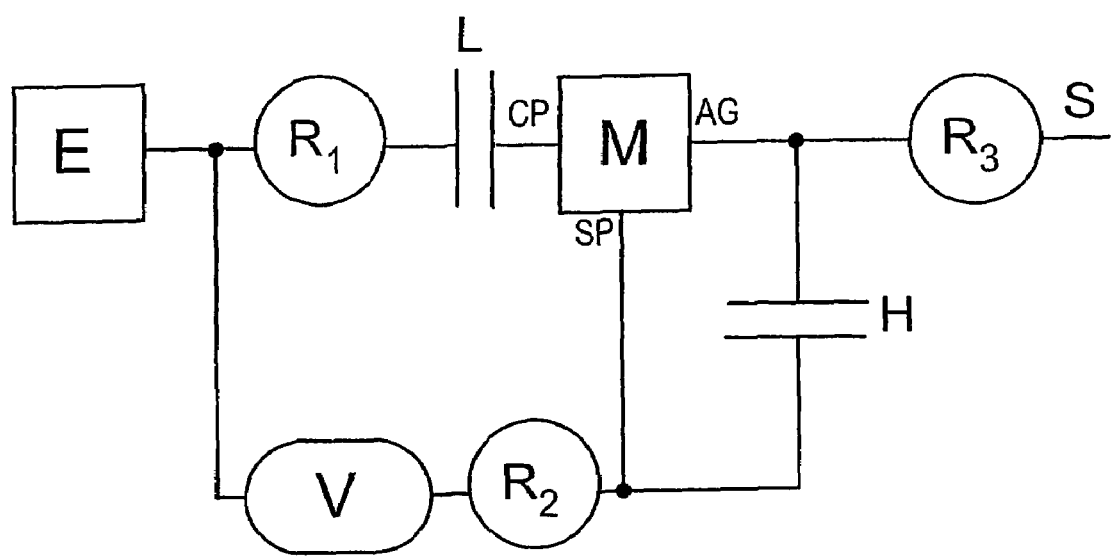
FIG. 2 is a highly schematic illustration of major components of a multi-regime transmission suitable for implementing the present invention.

FIG. 2 illustrates in highly schematic form a transmission to which the present invention is applicable, wherein an engine or other prime mover E is connectable to the planet carrier part CP of an epicyclic shunt or mixer M through transmission input I and input gearset $R_1$ and a low regime clutch L, and is also connected to one side of a variator V whose opposite side drives (or in some operating conditions is driven by) a sun part SP of the mixer M through intermediate gearing $R_2$. Drive is output via a shaft S connectable through a final drive gearset $R_3$ and a high regime clutch H to the output side of the variator V, the shaft S also being connected through gearset $R_3$ to an annular gear AG of the mixer M.

In operation, engaging low regime clutch L without engagement of high regime clutch H drives both the carrier part CP (through clutch L) and the sun part SP (through the variator) producing a speed at the annular gear AG dependent on the speed of both. The annular gear drives the output shaft S through gearing $R_3$. This is low regime.

In high regime, with only the high regime clutch H engaged, drive is taken from the engine through the variator and gearing $R_2$, $R_3$ to the output shaft. Hence in high regime the epicyclic mixer M essentially freewheels, its planet carrier part CP being free to rotate, and does not significantly affect transmission ratio.

In fixed synchronous ratio, with both clutches engaged, the sun and annular gears SP, AG are locked together. The planet carrier part CP is driven from the engine through gearing $R_1$ and consequently the transmission ratio is fixed at the synchronous ratio. The variator must in this condition be at a corresponding, predetermined, ratio.

This arrangement is known in itself to those skilled in the art. Practical implementations of it have been taught by various authors and will not be described herein. U.S. Pat. No. 5,564,998, referred to above, shows one suitable gearing arrangement. Furthermore other arrangements of the clutches and gearing are possible while retaining the facility to provide two (or more) different regimes.

Figure 3:
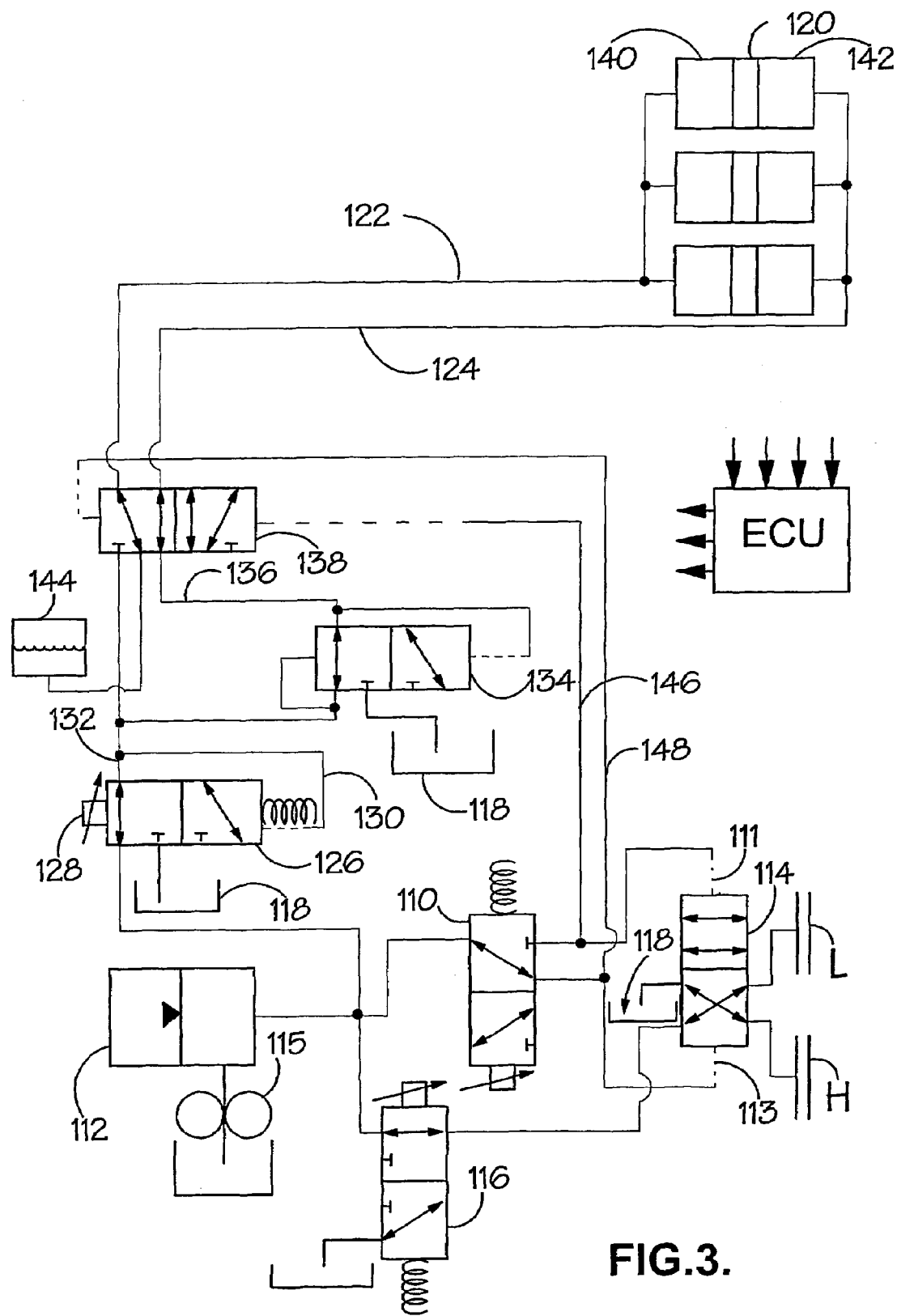
FIG. 3 is a diagram of a hydraulic variator control arrangement embodying the present invention.

Turning now to FIG. 3 a hydraulic circuit is illustrated which controls regime change and also supplies a control signal to the variator. The high and low regime clutches are again indicated at H and L. The process of regime change is here initiated by means of a solenoid shift valve 110 receiving a supply of hydraulic fluid at high pressure (50 Bar is suitable) from a source which in this example utilizes an accumulator 112 which is fed from a pump 115. The shift valve 110 has two output ports. In its two different states, the shift valve 110 applies the high pressure fluid respectively to opposite hydraulic control inputs 111, 113 of a clutch control valve 114 formed as a pilot controlled two position valve. One input port of the clutch control valve 114 receives a clutch apply pressure from a clutch fuse valve 116 whose function will be explained in more detail below. The clutch control valve's other input port is connected to low pressure, as indicated schematically by sump 118. Two output ports of the clutch control valve 114 are led respectively to the two regime-control clutches H and L.

In an initial state (illustrated) the solenoid shift valve 110 applies pressure to a first side 113 of the clutch control valve 114 and thereby causes it to adopt a first position in which it connects the clutch fuse valve 116 to the low regime clutch L, which is thereby engaged, while the high regime clutch H is connected to drain and so disengaged. Hence the transmission is in low regime. A change in state of the shift valve 110, dictated by the transmission's electronic control unit (ECU) acting through the solenoid of the shift valve 110, reverses the pilot signals to the clutch control valve 114 and so causes it to adopt a second state in which the low regime clutch L is vented to sump and the clutch apply pressure is fed instead to the high regime clutch H. High regime is thereby engaged. Subsequent switching of the shift valve 110, once more dictated by the ECU, back to its initial state once more reverses the pilot signals to the clutch control valve, causing it to vent the high regime clutch H to sump and to feed the clutch apply pressure to the low regime clutch, low regime being thereby restored. Hence the present invention provides for rapid change from high to low regime in a process initiated by the ECU but controlled by the hydraulic circuit.

The ECU is indicated by a box in FIG. 3, although its connections to the solenoids of the various valves are omitted for the sake of representational clarity.

The clutch fuse valve 116 provides a clutch apply pressure which is controlled to provide a desired torque capacity in the operative clutch. This torque capacity is intended to be great enough to transmit the desired transmit level of transmission torque (ie to avoid clutch slip during normal operation) but small enough to permit the clutch to slip upon occurrence of a torque spike, as may be caused e.g. by very rapid braking, thereby to protect the variator from excessive torque in such an eventuality. The clutch fuse valve 116 is a pressure reducing valve fed from the accumulator 112.

A simpler circuit could dispense with the clutch fuse valve 116 and simply provide for the high pressure from the accumulator 112 to be applied to the operative clutch, although the protective "fuse" function of the clutch would thereby be lost.

It will be understood from the aforegoing that in the illustrated embodiment the shift valve 110 serves to concurrently initiate the change in state of the clutches H, L required upon regime change. However the same valve 110 also serves to initiate the pressure changes in the hydraulic circuitry controlling the variator (referred to herein as the "reaction circuit") which are required upon regime change.

Figure 1:
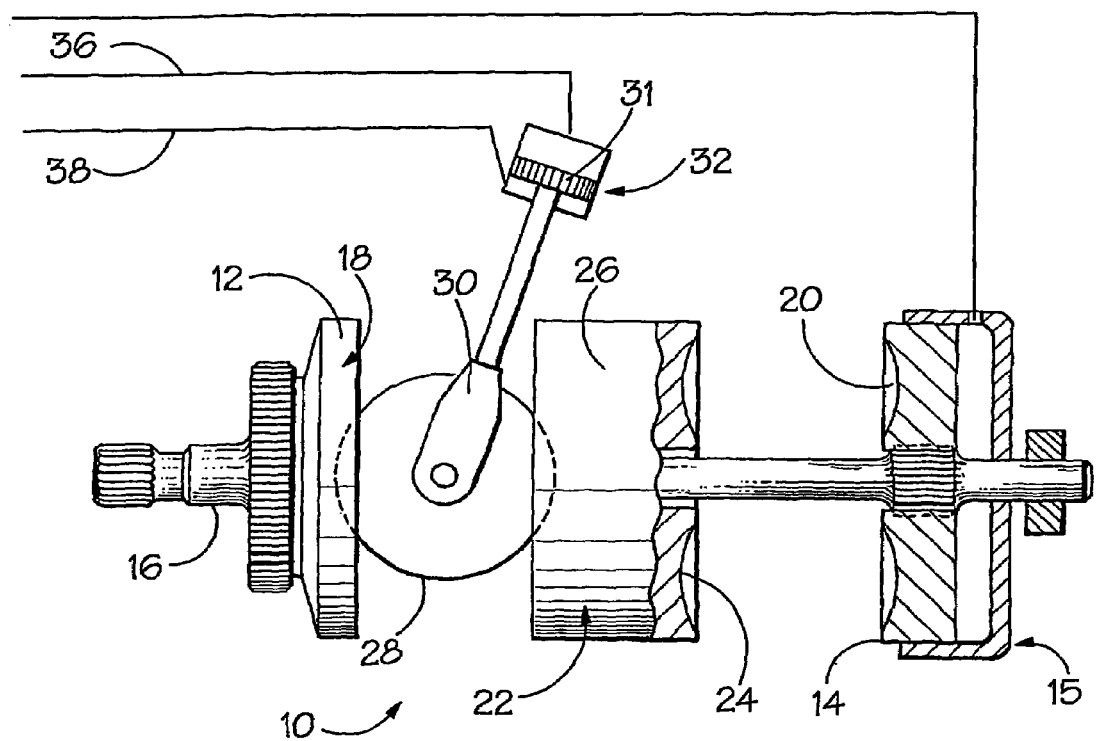
FIG. 1 is a highly simplified illustration of major components of a torque controlled, toroidal-race rolling-traction variator of known type.

A set of pistons 120 are indicated schematically in FIG. 3 and correspond to the piston 31 of FIG. 1. Each acts on a corresponding roller (formed similarly to the roller 28 of FIG. 1, but omitted from FIG. 3 for the sake of representational simplicity) of the variator V. While FIG. 3 shows only three pistons 120 for the sake of clarity, a typical double cavity variator comprises six such pistons. Hydraulic fluid is applied to opposite faces of the pistons through control lines 122, 124 corresponding to the lines 36, 38 of FIG. 1.

It is necessary to provide an adjustable variator control pressure for application to the pistons 120, this being the main control signal to the variator. The illustrated embodiment provides the variator control pressure in an unconventional manner by means of a variator control valve 126 (formed as a pressure reducing valve) fed with high pressure fluid from the source 112. The variator control valve 126 receives opposed control inputs from (1) a solenoid 128 controlled by the ECU and (2) a pilot line 130 connected to a point in the circuit between the variator control valve 126 and the pistons 122, and thus providing a feedback signal representing the variator control pressure. In dependence upon a comparison of these two signals, the variator control valve 126 connects an output line 132 either to the high pressure source 112 or to a pressure sink in the illustrated embodiment formed by the sump 118. In this way the valve 126 provides at its output a controllable pressure determined by the ECU.

A reducing valve 134 receives the variator control pressure from the output line 132 and provides at its output 136 a reduced control pressure. In the illustrated embodiment valve 134 is such that:

reduced control pressure=variator control pressure×$K$ where K is a constant less than one. Valves capable of performing this function are known to those skilled in hydraulics. The illustrated example connects output 136 either to the variator control pressure or to the sump 118, dependent upon a comparison of pilot signals corresponding to the reduced control pressure and the variator control pressure, this comparison being weighted (e.g. by having the pilot signals act on different area faces of the valve spool) to provide the required value of the constant K.

A switching valve 138 receives both the variator control pressure and the reduced control pressure and directs these to the pistons 120 as appropriate. In the illustrated state of the switching valve 138, corresponding to low regime, a first side 142 of each piston 120 is connected by the switching valve 138 to the reduced control pressure from the reducing valve 134. The second side 140 of each piston is connected to a low pressure provided in the illustrated embodiment by a reservoir 144.

The switching valve 138 however has a second state in which it connects the full variator control pressure from the variator control valve 126 to the second sides 140 of the pistons 120, while the first piston sides 142 are connected to the low pressure reservoir 144.

The state of the switching valve 138 is controlled by opposed pilot pressure signals taken through pilot lines 146, 148 which lead, via a crossover valve 150 whose function will be explained below, to respective outputs of the solenoid shift valve 110.

To understand the operation of the reaction circuit, consider what happens as the engine accelerates and the transmission ratio falls. The circuit is initially in the illustrated state and in low regime. As pointed out previously, low regime requires a lower control pressure upon the pistons 120 than does high regime, and this is provided by virtue of the reducing valve 134 through which pressure is applied to first sides 142 of the pistons 120. When the synchronous ratio is achieved the ECU changes the state of the solenoid shift valve 110 and consequently the pilot signals through lines 146, 148 are reversed, changing the state of the switching valve 138 which consequently applies the fill variator control pressure to the second sides 140 of the pistons 120. In this way both the required change in sense of the main variator input and the required change in magnitude are provided automatically and concurrently.

Because pressures at the two different levels (full variator control pressure and reduced control pressure) are continuously available, the changes can be made very rapidly.

It will also be noted that the changes in clutch state and the changes in the variator input required for regime change are concurrently initiated by the solenoid shift valve 110. The relative timing of these events can consequently be accurately controlled, which is important in achieving a smooth regime change, by appropriate formation of the hydraulics. While the changes in clutch state and in the reaction circuit pressures take a finite time, and it may be preferable to have them begin at different instants during the regime change process, the change can be rapid and takes place in what is essentially a single stage process. In fact these changes will typically all take place at the same time.

The crossover valve 150 allows the pressures applied to the pistons 120 to be reversed without change of transmission regime. This is necessary to change the transmission from a "driving" state, in which power flows from the engine through the transmission to the wheels, and an "over-run" state, in which power is passed back from the wheels to the engine (e.g. to provide engine bracing). The crossover valve is controlled by the ECU through a valve solenoid and serves to swap the pilot signals in lines 146, 148, thereby changing the state of the switching valve 138 (and hence reversing the direction of action of the pistons 120) without changing the state of the clutches H, L.

FIGS. 4 to 7 show variants of the hydraulic circuit. In each, certain components are common to the circuit illustrated in FIG. 3 and these are given the same reference numerals throughout. However for the sake of representational simplicity the clutches H, L and valves 114, 116 are omitted from FIGS. 4 to 7.

Figure 4:
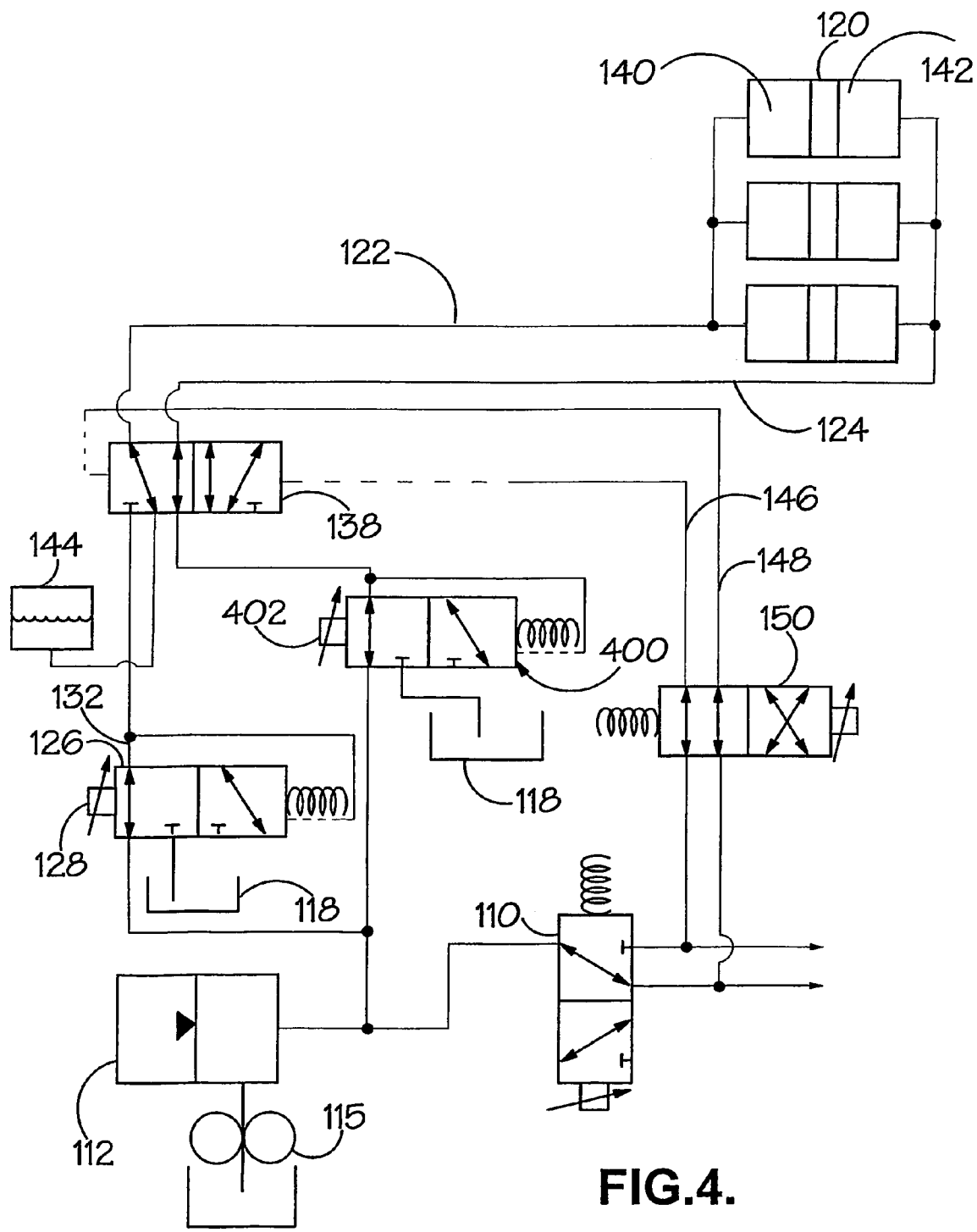
FIG. 4 is a diagram of an alternative reaction circuit for use in the hydraulic variator control arrangement.

In FIG. 4, the reducing valve 134 of FIG. 3 has been replaced by a second variator control valve 400 which receives high pressure fluid from the accumulator 112 and delivers an output pressure controlled, through a solenoid 402, by the ECU. This output pressure is led to the switching valve 138.

The second variator control valve 400 may be identically formed to the first variator control valve, in which case the ECU controls the two valves to provide the different pressures required in high and low regimes.

Alternatively the second variator control valve 400 may be constructed differently from the first, the ECU sending the same signal to the two solenoids 128 and 402 and the two valves producing different pressures in response, corresponding respectively to the pressures required in high and low regimes.

Figure 5:
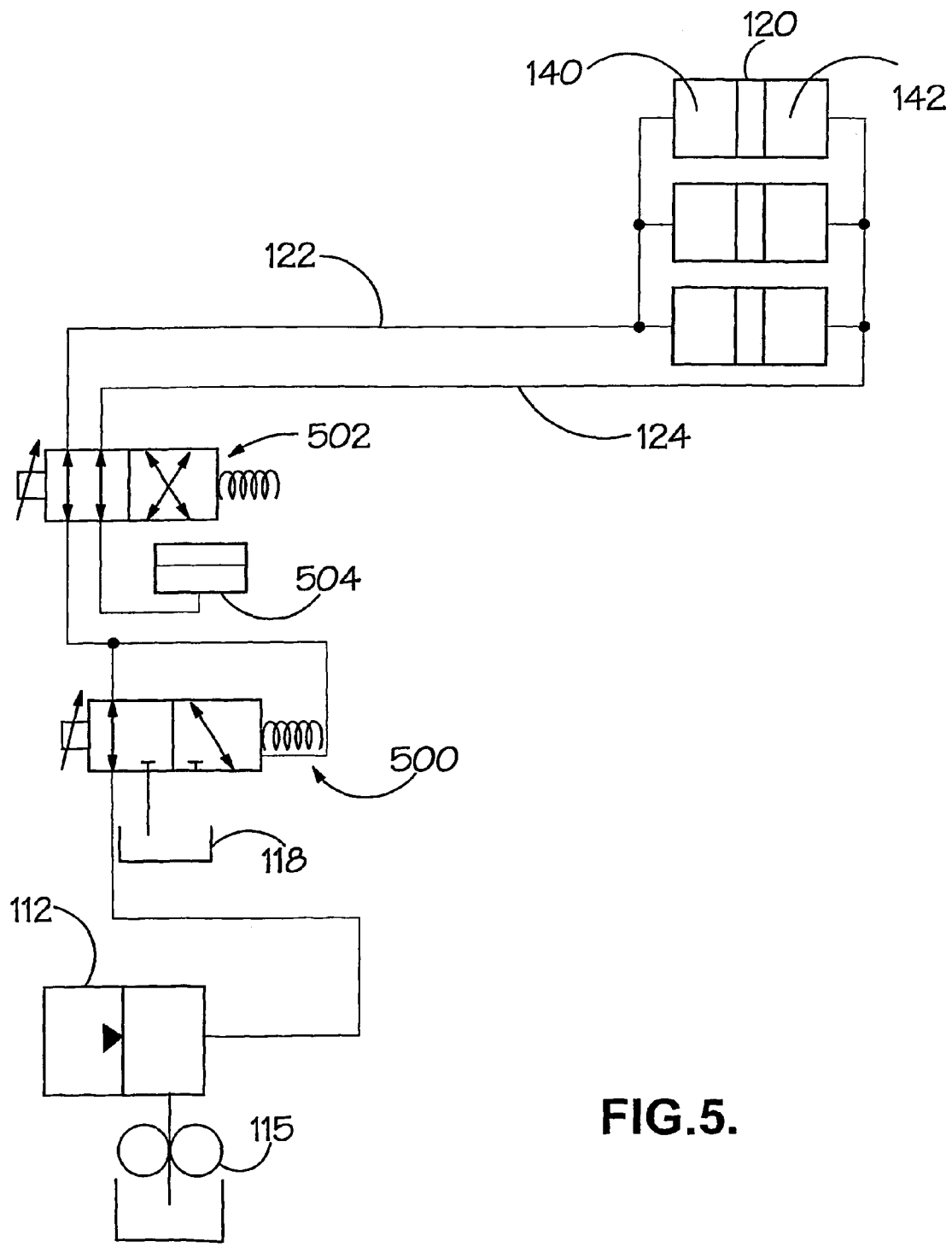
FIG. 5 is a diagram of another alternative reaction circuit for use in the hydraulic variator control arrangement.

FIG. 5 shows a reaction circuit which is constructionally more simple, using a single variator control valve 500 selectively connectable to either side of the actuators 120 through a crossover valve 502 controlled in this embodiment by the ECU (and not by the hydraulics, as in FIG. 3). The other side of the actuators is connected by the crossover valve to a low pressure source formed in this example as a reservoir 504. The FIG. 5 reaction circuit is controlled by the ECU. Coordination of the changes in the reaction circuit with the changes in clutch state must therefore be provided by means of software in this circuit. The ECU can provide active control of the relative timing of these events. The change in pressure required upon regime change must also be software controlled, an adjustment of the valve 500 being carried out during regime change.

Figure 6:
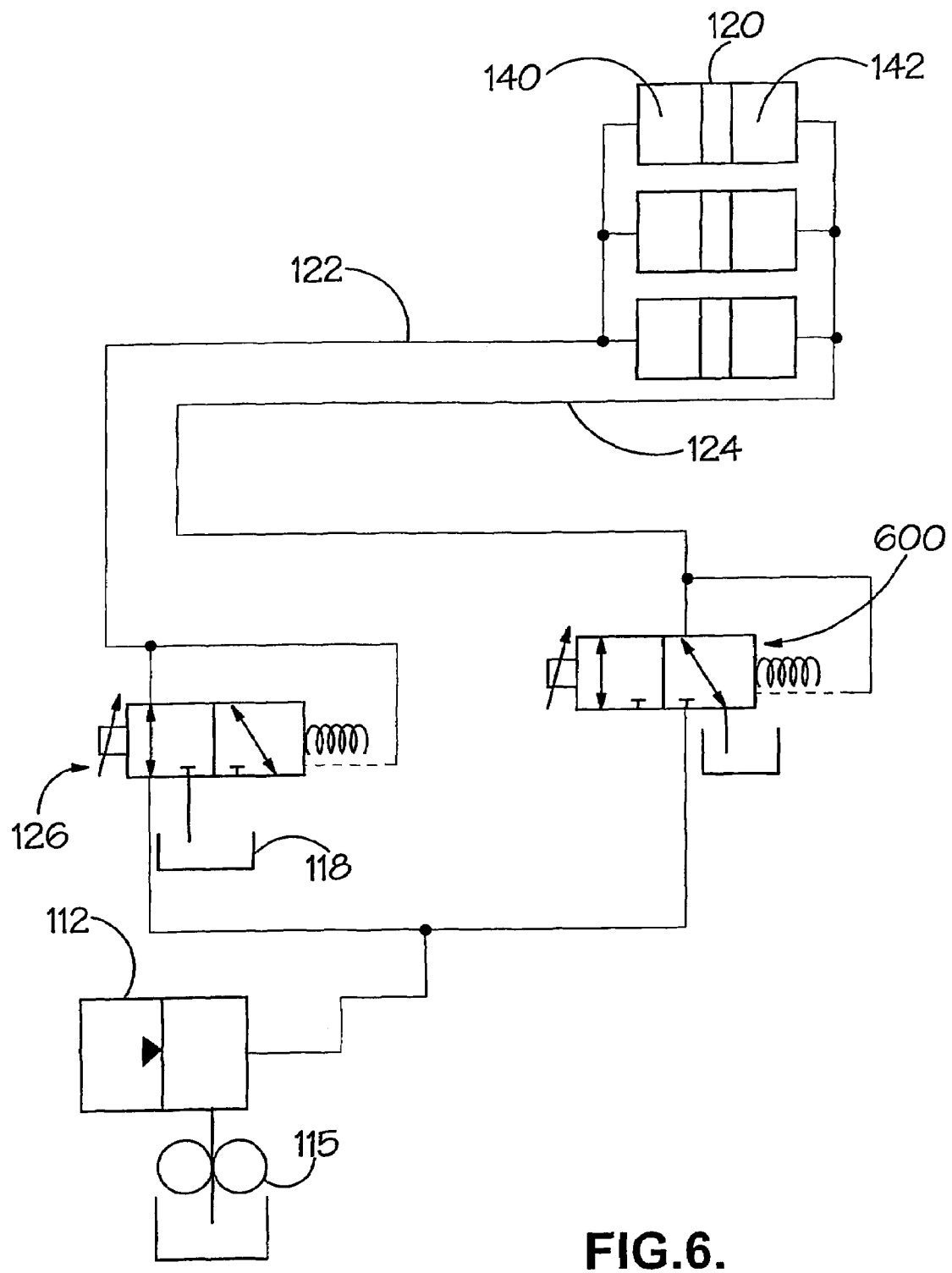
FIG. 6 is a diagram of another alternative reaction circuit for use in the hydraulic variator control arrangement.

The circuit in FIG. 6 dispenses with the switching valves 138 and 150. Here, the first variator control valve 126 is connected directly to one side of the actuators 120 through line 122. A second variator control valve 600, similarly formed to the first and receiving fluid from the accumulator 112, is connected directly to the other side of the actuators 120 through line 124. Here again the pressure changes required upon regime change must be controlled by the ECU, the valves 126 and 600 being rapidly adjusted to achieve the pressure changes at the appropriate time relative to the clutch changes.

Figure 7:
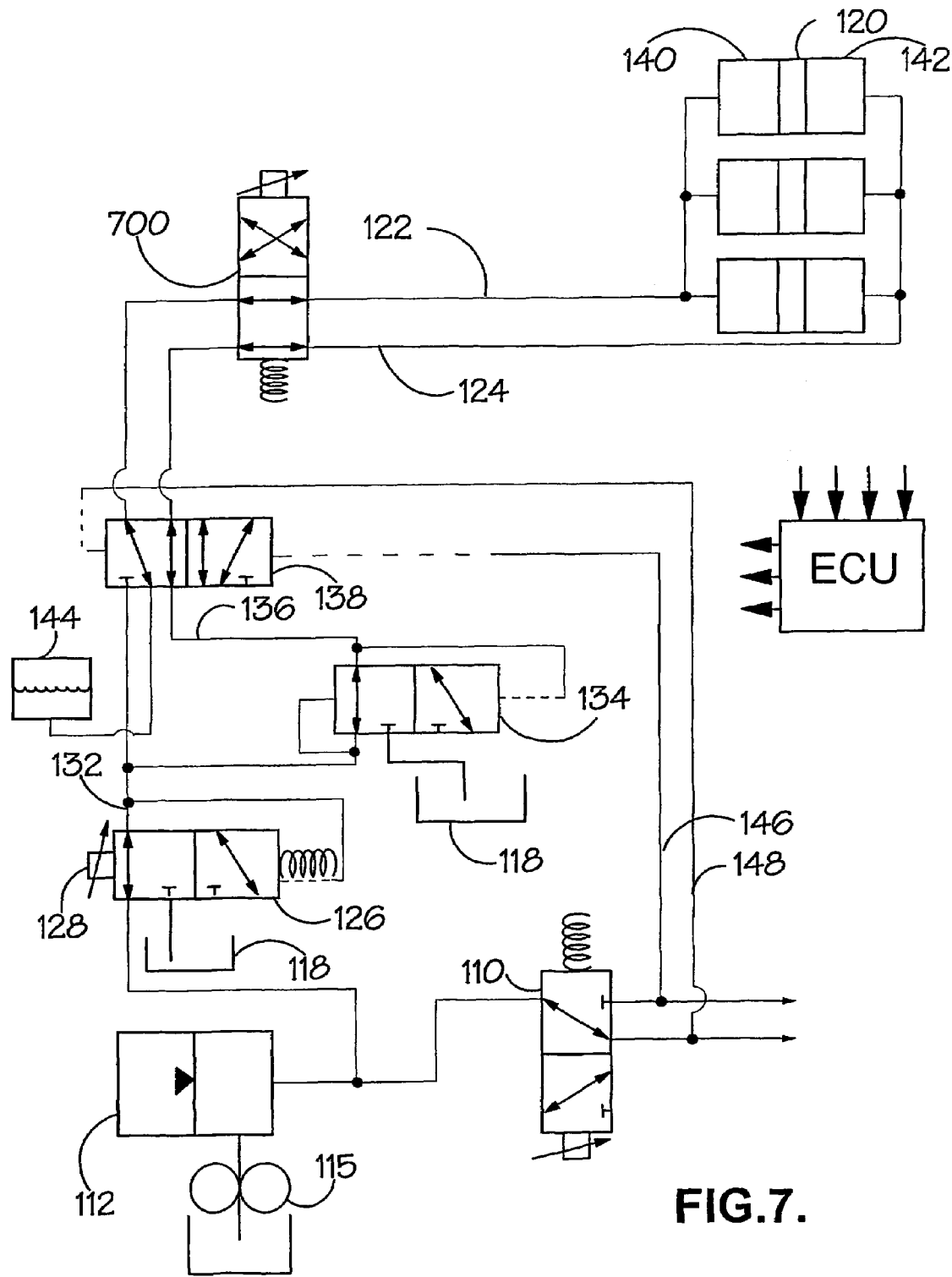
FIG. 7 is a diagram of another alternative reaction circuit for use in the hydraulic variator control arrangement.

FIG. 7 differs from FIG. 3 with regard to the positioning of the crossover valve 150, 700. In FIG. 3 switching of the crossover valve 150 causes a change in state of the switching valve 138 which consequently swaps from applying the output of variator control valve 126 to the left side of the actuators 120 to applying the output of reducing valve 134 to the right side of the actuators. This causes the direction of action of the actuators to change, as desired, but it also produces a change in the magnitude of the actuator force which is not always desirable and may have to be compensated for by the ECU.

In FIG. 7 this complication is avoided by positioning the crossover valve 700 in the lines 122, 124 feeding the actuators 120. Hence in this circuit the actuator pressures are swapped by the valve 700 without any resultant change in their magnitudes.

Figure 8:
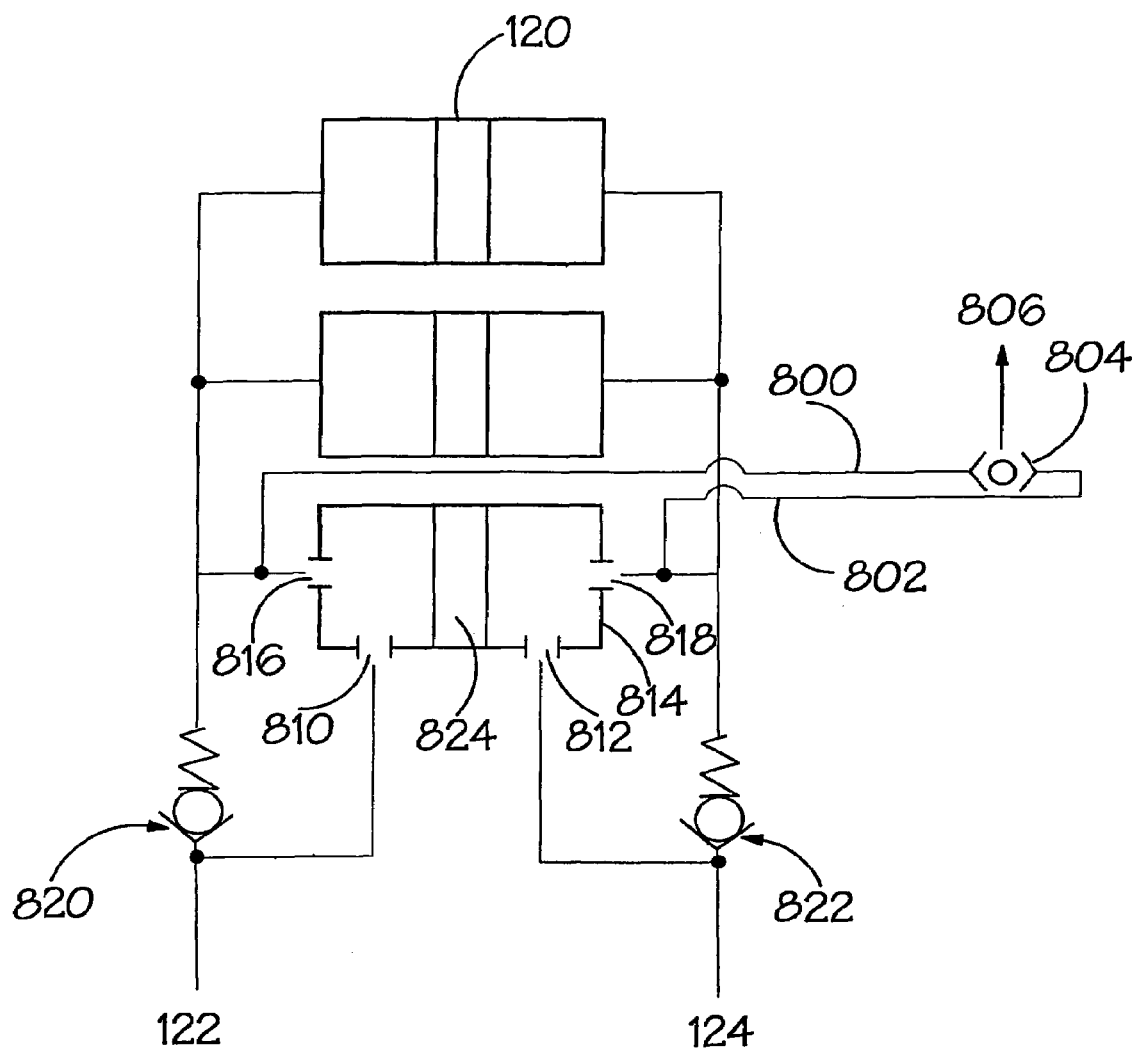
FIG. 8 is a diagram of specific features of the control arrangement providing "end load" and "hydraulic stop" functions.

FIG. 8 illustrates developments of the earlier circuits to show how "end load" and "hydraulic stop" functions can be provided.

The lines 122, 124 feeding opposite sides of the actuator pistons 120 are once more seen in FIG. 8. The reaction circuit supplying these two lines is omitted, but may take any of the forms illustrated in FIGS. 3 to 7.

Recall that in the FIG. 1 circuit a hydraulic arrangement 15 is used to bias the variator rollers and discs toward each other, thereby providing the traction required to enable the variator to transmit drive.

The pressure applied to this arrangement needs to be varied in sympathy with the pressures applied to the actuators 120, in order to regulate the traction coefficient at the roller/disc interfaces. This is achieved by means of connections 800, 802 which receive pressures from respective sides of the actuator pistons 120 and are led to a valve arrangement 804 whose function is to output at 806 the higher of the two pressures. Output 806 may be led directly to the end load arrangement 15 or may be used to control a further valve system (not illustrated) by which arrangement 15 is supplied.

In the type of variator illustrated in FIG. 1 it is necessary to limit the travel of the pistons 31, 120 by means of end stops since excessive travel could lead to the rollers 28 running off the discs 12, 14, 26. During operation of the end stops it remains necessary to match the end load to the reaction circuit pressures and this is achieved by use of hydraulic end stops.

In FIG. 8 the only routes for fluid to flow out of the hydraulic actuators and back to the reaction circuit is through side ports 810, 812 of a master actuator cylinder 814. Fluid can enter the master cylinder either through the side ports 810, 812 or through end ports 816, 818 but its escape through the latter is presented by non-return valves 820, 822. Hence if the master piston 824 moves far enough to the left to close left-hand side port 810 then the hydraulic stop comes into effect, a volume of fluid trapped in the left hand side of each actuator presents their further left-hand motion. Note that the consequent rises in the pressure in the left hand line 122 is passed on to the valve arrangement 804 and so to the end load.

Rightward motion of the pistons is limited in a similar manner.

The invention claimed is:
1. A continuously variable transmission comprising:
a transmission input,
a transmission output,
a variator which provides a continuously variable variator ratio, and gearing constructed and arranged to couple the variator between the transmission input and the transmission output in either of a low regime and a high regime, so that the transmission output is drivable from the transmission input at a transmission ratio which is related to the variator ratio, the relationship between the variator ratio and the transmission ratio being different in the two regimes, the gearing incorporating a first hydraulically actuated clutch to engage and disengage the low regime and a second hydraulically actuated clutch to engage and disengage the high regime and being such as to provide a synchronous ratio at which a change between low and high regimes at constant variator ratio produces no change in transmission ratio, and the transmission being provided with hydraulics incorporating a shift valve which controls application of hydraulic pressures to the first and second clutches, so that a change in state of the shift valve causes one clutch to change from engaged to disengaged and the other clutch to change from disengaged to engaged, and causing the transmission to change from one regime to the other, the transmission further comprising a hydraulic actuator, wherein the hydraulic actuator's force determines variator reaction torque, a valve arrangement for providing first and second variator control pressures, and a switching valve having a first state in which it applies the first variator control pressure to a first side of the hydraulic actuator, and a second state, in which it applies the second variator control pressure to a second side of the hydraulic actuator, so that a change in state of the switching valve produces a change in magnitude and direction of the actuator's force, the state of the switching valve being controlled by the shift valve.

2. A continuously variable transmission as claimed in claim 1 wherein the shift valve is a two state valve which causes the transmission to adopt low regime when in one state and high regime when in the other state.

3. A continuously variable transmission as claimed in claim 1 wherein the engagement of one clutch and the disengagement of the other clutch take place concurrently.

4. A continuously variable transmission as claimed in claim 1 wherein the shift valve is an electrically controlled valve which applies a hydraulic control pressure to a clutch control valve which in turn controls application of hydraulic pressures to the first and second clutches.

5. A continuously variable transmission as claimed in claim 4 wherein the clutch control valve has two states in one of which it connects the first clutch to high pressure and exhausts the second clutch and in the other of which it connects the second clutch to high pressure and exhausts the first clutch.

6. A continuously variable transmission as claimed in claim 1 wherein the first variator control pressure is supplied to a reducing valve whose output pressure forms the second variator control pressure.

7. A continuously variable transmission as claimed in claim 6 wherein the reducing valve maintains a substantially constant ratio between the first and second control pressures.

8. A continuously variable transmission as claimed in claim 1 further comprising a crossover valve connected between the switching valve and the hydraulic actuator so that a change in state of the crossover valve reverses the direction of action of the hydraulic actuator without the regime change.

9. A continuously variable transmission as claimed in claim 8 wherein the crossover valve is electrically controlled independently of the shift valve.

* * * * *

UNITED STATES PATENT AND TRADEMARK OFFICE
CERTIFICATE OF CORRECTION

| | | |
|---|---|---|
| PATENT NO. | : 7,625,309 B2 | Page 1 of 1 |
| APPLICATION NO. | : 10/541955 | |
| DATED | : December 1, 2009 | |
| INVENTOR(S) | : John William Edward Fuller | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 683 days.

Signed and Sealed this

Twenty-sixth Day of October, 2010

David J. Kappos
*Director of the United States Patent and Trademark Office*